(12) United States Patent
Schueler

(10) Patent No.: US 6,615,806 B2
(45) Date of Patent: Sep. 9, 2003

(54) FUEL INJECTION SYSTEM WITH FUEL PREHEATING AND WITH A FUEL-COOLED PRESSURE REGULATING VALVE

(75) Inventor: Peter Schueler, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/994,897

(22) Filed: Nov. 28, 2001

(65) Prior Publication Data

US 2002/0078929 A1 Jun. 27, 2002

(30) Foreign Application Priority Data

Nov. 28, 2000 (DE) ......................... 100 59 012

(51) Int. Cl.$^7$ .............................................. F02M 37/04
(52) U.S. Cl. ..................... 123/514; 123/557; 123/464
(58) Field of Search .................. 123/514, 557, 123/541, 41.31, 464

(56) References Cited

U.S. PATENT DOCUMENTS

| | | | | | |
|---|---|---|---|---|---|
| 4,187,813 | A | * | 2/1980 | Stumpp | 123/514 |
| 4,452,213 | A | * | 6/1984 | Duprez | 123/516 |
| 4,574,762 | A | * | 3/1986 | Muller et al. | 123/514 |
| 4,625,701 | A | * | 12/1986 | Bartlett et al. | 123/514 |
| 4,893,603 | A | * | 1/1990 | Siebels | 123/514 |
| 5,085,198 | A | * | 2/1992 | Bartlett et al. | 123/510 |
| 5,207,203 | A | * | 5/1993 | Wagner et al. | 123/514 |
| 5,263,456 | A | * | 11/1993 | Owen-Evans | 123/514 |
| 5,269,276 | A | * | 12/1993 | Brown | 123/514 |
| 5,685,278 | A | * | 11/1997 | Bradford et al. | 123/514 |
| 5,887,572 | A | * | 3/1999 | Channing | 123/514 |
| 6,289,879 | B1 | * | 9/2001 | Clausen | 123/516 |

* cited by examiner

*Primary Examiner*—Thomas N. Moulis
(74) *Attorney, Agent, or Firm*—Ronald E. Greigg

(57) ABSTRACT

A fuel injection system for internal combustion engines is proposed in which gelation of the fuel is avoided by a fuel preheating that operates as a function of temperature. A pressure regulating valve of a common rail can be cooled as well.

11 Claims, 2 Drawing Sheets

FUEL INJECTION SYSTEM WITH FUEL PREHEATING AND WITH A FUEL-COOLED PRESSURE REGULATING VALVE

BACKGROUND OF THE INVENTION

1. Field of the Invention

The invention relates to an improved fuel injection system for internal combustion engines.

2. Description of the Prior Art

Fuel injection systems are known with have a high-pressure fuel pump, a common rail, and at least one injector, wherein the high-pressure fuel pump supplies the injector or injectors with fuel via the common rail. A prefeed pump pumps fuel out of a tank to the high-pressure fuel pump via a supply line, and a return line carries fuel away from the common rail. A pressure regulating valve is disposed between the common rail and the return, and a leakage line carries fuel away from the high-pressure fuel pump.

In this fuel injection system, gelation of the fuel in the supply line can occur if the ambient temperature is low enough.

OBJECT AND SUMMARY OF THE INVENTION

The object of the invention is to furnish a fuel injection system in which no gelation of the fuel occurs.

This object is attained according to the invention by a fuel injection system for internal combustion engines, having a high-pressure fuel pump, having a common rail, having at least one injector, wherein the high-pressure fuel pump supplies the injector or injectors with fuel via the common rail, having a prefeed pump that pumps out of a tank to the high-pressure fuel pump via a supply line, having a return line for carrying fuel away from the common rail, having a pressure regulating valve disposed between the common rail and the return, and having a leakage line for carrying fuel away from the high-pressure fuel pump, wherein the pressure regulating valve and the supply line can be made to communicate hydraulically as a function of the temperature of the fuel in the supply line.

In the pressure regulating valve, some of the fuel, which is at high pressure, is depressurized from the common rail. The energy dissipated in the process causes heating of the fuel in the pressure regulating valve. If this heated fuel is fed into the supply line, it is assured that no gelation will occur in the supply line, in a fuel filter disposed in it, and in the high-pressure fuel pump.

Since no electrical heating elements or the like are needed for the fuel preheating, but instead the thermal energy contained in the fuel in the return line is used for the fuel preheating, the fuel injection system of the invention is simple in design. In addition, the fuel preheating of the invention requires no additional energy input.

In one feature of the invention, it is provided that the hydraulic communication of the return line and supply line is established by a temperature valve, and that the temperature valve divides the supply line into a first portion between the prefeed pump and the temperature valve and a second portion between the temperature valve and the high-pressure fuel pump, so that the hydraulic communication of the return line and the supply line is attained in a simple, reliable way.

Further variants of the invention provide that the temperature valve is embodied as a multiposition valve, in particular as a 1½-way valve, or as a flow control valve, so that the invention can be realized in accordance with the required regulation quality and the specified cost framework.

In a further feature of the invention it is provided that the pressure regulating valve has an inlet, a first outlet, and a second outlet; that the inlet communicates hydraulically with the common rail; and that the pressure regulating valve establishes a hydraulic communication between the inlet on the one hand and the first outlet and the second outlet on the other as a function of the pressure in the common rail. By the use of a pressure regulating valve having one inlet and two outlets, it is possible to attain not only fuel preheating but also cooling of the pressure regulating valve.

In the context of the invention, the term "outlet" means that through the outlet, fuel can both flow out of the pressure regulating valve and flow into the pressure regulating valve. The flow direction of the first and second outlets of the pressure regulating valve depends on the counterpressure in the lines communicating with the outlets. The prefeed pump, for instance, has a pumping level of approximately 6.5 bar to 8.5 bar, while in the return line, a pressure of approximately 1.2 bar to 1.6 bar prevails. Because of the extraordinarily high pressure of up to 1500 bar in the common rail, a return flow does not occur out of the low-pressure region of the fuel injection system into the common rail through the pressure regulating valve.

Since the pressure regulating valve must sometimes dissipate high thermal loads, and the pressure regulating valve is temperature-sensitive, the function of the fuel injection system of the invention is improved if the pressure regulating valve is cooled and thus the temperature range within which the pressure regulating valve functions is narrowed.

The combination of fuel preheating and cooling of the pressure regulating valve is attained in that in a first switching position of the temperature valve, the first outlet of the pressure regulating valve communicates with the return line, the second outlet of the pressure regulating valve communicates with the leakage line, and the prefeed pump pumps via the supply line into the high-pressure fuel pump; that in a second switching position of the temperature valve, the first outlet of the pressure regulating valve communicates with the first portion of the supply line, the second outlet of the pressure regulating valve communicates with the second portion of the supply line, and the leakage line communicates with the return line.

In the first switching position, the fuel is pumped to the high-pressure fuel pump. The temperature valve assumes this switching position when the temperature of the fuel in the prefeed line is so high that no gelation of the fuel will occur even without fuel preheating. In this first switching position, the leakage flow removed from the high-pressure fuel pump and the fuel quantity used to lubricate the high-pressure fuel pump are carried into the pressure regulating valve via the second outlet, so that with this fuel flow, cooling of the pressure regulating valve is accomplished. This fuel flow is carried away via the return line, together with the fuel, flowing from the inlet into the pressure regulating valve, that is severely heated in the throttling that takes place in the pressure regulating valve. Typically, the return line discharges into the tank. Since the fuel filter is not subjected to the high temperatures of this fuel, impermissibly high temperatures do not occur in the fuel filter, either.

In a second switching position, the prefeed pump pumps fuel to the pressure regulating valve via the first portion of the supply line. This fuel mixes with the fuel from the common rail, which has been depressurized in the pressure regulating valve, resulting overall in heating of the fuel in the second outlet of the pressure regulating valve. Next, via the second portion of the supply line, this fuel is delivered to the high-pressure fuel pump, so that in the second switching position, gelation of the fuel in the second portion of the supply line is prevented. The second switching position is assumed when the ambient temperature is quite low and furthermore the engine has not yet reached its operating temperature. Because of the counterpressure sensitivity of the pressure regulating valve, the regulation quality of the pressure in the common rail is not as good in this switching position as in the first switching position of the temperature valve. However, since the second switching position is assumed only at low ambient temperatures and during the engine warmup phase, any slight drop in of the regulation quality that might occur is tolerable for such brief phases during operation.

In the first switching position, which is assumed for by far the greatest portion of the engine operating time, the regulation quality is very high, since the counterpressure in the return line is virtually constant.

Further features of the invention provide that a temperature sensor is provided in the second portion of the supply line, and that the temperature valve is triggered as a function of the temperature ascertained by the temperature sensor, so that the switchover of the temperature valve from the first switching position to the second and vice versa can be accomplished in a simple way. It is also possible for the temperature valve to be triggered by a control unit.

In another feature of the invention, a fuel filter, in particular a fuel filter with a water separator, is provided in the second portion of the supply line, so that gelation of the fuel filter in the fuel injection system of the invention is also prevented.

BRIEF DESCRIPTION OF THE DRAWINGS

The invention will be better understood and further objects and advantages thereof will become more apparent from the ensuing detailed description of a preferred embodiment taken in conjunction with the drawing, in which.

DESCRIPTION OF THE PREFERRED EMBODIMENT

Figure 1:
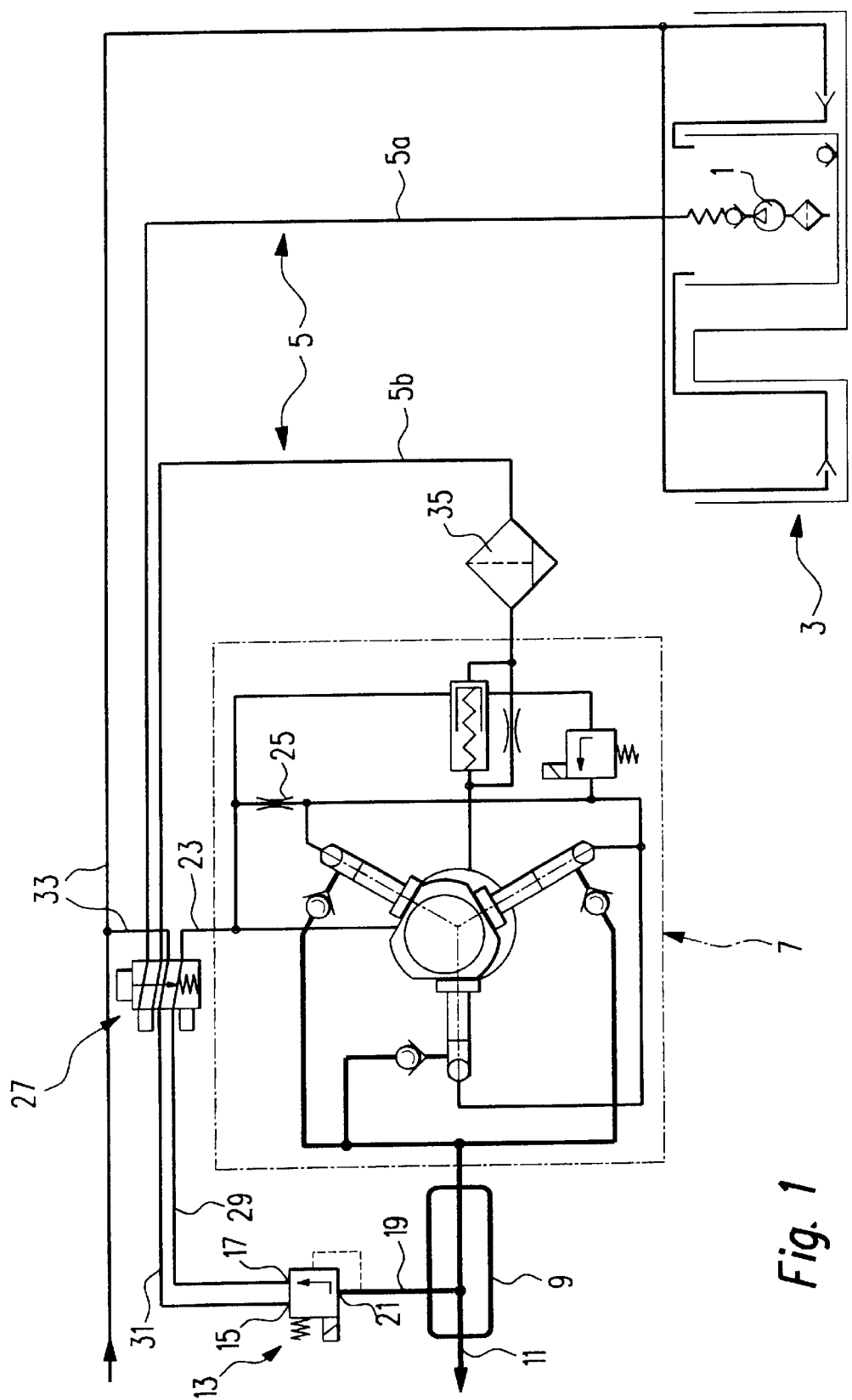
FIG. 1 schematically shows one exemplary embodiment of a fuel injection system of the invention in the first switching position of the temperature valve.

In FIG. 1, a fuel injection system of the invention is shown schematically. A prefeed pump 1 pumps fuel out of a tank 3 via a supply line 5 to a high-pressure fuel pump 7. The high-pressure fuel pump 7 is embodied as a radial piston pump and will not be described in further detail. The high-pressure fuel pump 7 pumps fuel at high pressure into a common rail 9. Via one or more high-pressure lines 11, the common rail supplies one or more injectors, not shown, with fuel. To enable regulating the pressure in the common rail, a pressure regulating valve 13 is provided. The electrically actuated pressure regulating valve 13 is triggered by a control unit, not shown. The pressure regulating valve 13 can effect the pressure in the common rail 9 by means of a continuous adjustment, for instance of a slide, which uncovers a first outlet 15 and a second outlet 17. Alternatively, the pressure regulating valve 13 can also switch back and forth between two switching positions.

A first connecting line 19 between the pressure regulating valve 13 and the common rail 9 discharges into an inlet 21 of the pressure regulating valve. A leakage line 23 leads out of the high-pressure fuel pump 7 and carries away the fuel used for lubricating the high-pressure fuel pump as well as the fuel flowing out through a zero-feed throttle 25. The leakage line 23 discharges into a temperature valve 27, which in the exemplary embodiment shown is embodied as a 10/2-way valve. Via a second connecting line 29, the leakage line 23 communicates with the second outlet 17 of the pressure regulating valve 13. The first outlet 15 of the pressure regulating valve 13 communicates with a return line 33 via a third connecting line 31.

In the first switching position, shown in FIG. 1, of the temperature valve 27, the fuel from the leakage line 23 is delivered to the pressure regulating valve 13 via the second connecting line 29 and cools the pressure regulating valve 13. The fuel from the leakage line 23 and from the first connecting line 19, which is throttled off in the pressure regulating valve 13, is delivered via the third connecting line 31 to the return line 33, which in turn discharges into the tank 3.

The first switching position of the temperature valve 27 is assumed when the ambient temperature is not extraordinarily low and the engine has essentially reached its operating temperature. In this first switching position, the prefeed pump 1, via the supply line 5, pumps fuel to the high-pressure fuel pump 7. The pressure regulating valve 13 is cooled with the leakage quantity from the high-pressure fuel pump 7, so that the regulation quality of the pressure regulating valve 13 is improved, since the temperature range within which the pressure regulating valve 13 is operated is narrowed. Since the counterpressure of the pressure regulating valve 13 is specified by the pressure in the return line 33, which is approximately constant and is between 1.2 and 1.6 bar, in this first switching position the pressure regulating valve 13 can be operated with a very good regulation quality.

The supply line 5 is divided by the temperature valve 27 into a first portion 5a, which connects the prefeed pump 1 to the temperature valve 27, and a second portion 5b, which connects the temperature valve 27 to the high-pressure fuel pump 7. A fuel filter 35 with a water separator is installed in the second portion 5b. In the first switching position, the fuel filter is supplied with fuel that comes directly from the tank, so that impermissibly high temperatures of the fuel cannot occur at the fuel filter 35.

Figure 2:
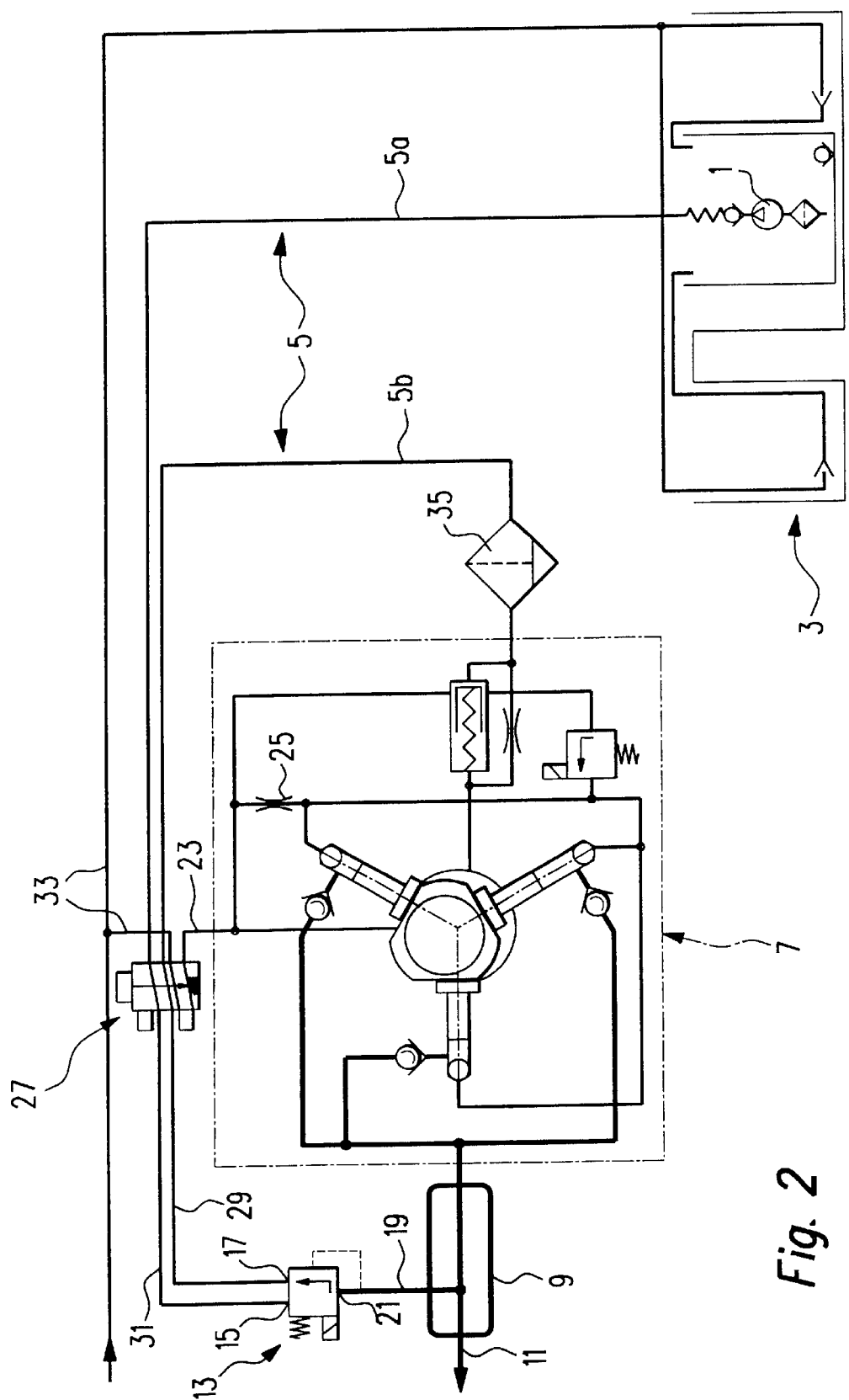
FIG. 2 schematically shows the fuel injection system of the invention as in FIG. 1, but in the second switching position.

FIG. 2 shows the exemplary embodiment of the fuel injection system of the invention in the second switching position of the temperature valve 27. The reference numerals correspond to those chosen for FIG. 1, and the description of FIG. 1 pertains accordingly.

In the second switching position, the prefeed pump 1 pumps fuel to the pressure regulating valve 13 via the first portion 5a and the third connecting line 31. In the pressure regulating valve 13, this fuel is mixed with the fuel, arriving from the first supply line portion 5a, that is heated as a result of the throttling in the pressure regulating valve 13, so that in the second outlet 17, preheated fuel flows via the second connecting line 29 and the second portion 5b to the high-pressure fuel pump 7. In this second switching position, which is assumed at low ambient temperature and with a cold engine, it is assured that the fuel in the second portion 5b, the fuel filter 35, the temperature valve 27, and the high-pressure fuel pump 7 is markedly warmer than the gelation temperature of the fuel.

In the second switching position shown in FIG. 2, the fuel carried away from the high-pressure fuel pump via the leakage line 23 flows into the return line 33. Since the second switching position is assumed only when the ambient temperature is low and/or the engine has not yet reached its operating temperature, the pressure regulating valve 13 does not need to be cooled. Furthermore, in this second switching position, the pressure regulating valve 13 is cooled by the cold fuel from the tank 3.

The foregoing relates to a preferred exemplary embodiment of the invention, it being understood that other variants and embodiments thereof are possible within the spirit and scope of the invention, the latter being defined by the appended claims.

I claim:

1. A fuel injection system for internal combustion engines, including a high-pressure fuel pump (7), a common rail (9), at least one injector receiving fuel from the high-pressure fuel pump (7) via the common rail (9), a prefeed pump (1) that pumps out of a tank (3) to the high-pressure fuel pump (7) via a supply line (5), a return line (33) for carrying fuel away from the common rail (9), a pressure regulating valve (13) disposed between the common rail (9) and the return line (33), a leakage line (23) for carrying fuel away from the high-pressure fuel pump (7), and control means (27) for selectively connecting the pressure regulating valve (13) with the supply line (5b) as a function of the temperature of the fuel in the supply line (5, 5a, 5b) whereby fuel from the prefeed pump (1) flows through the pressure regulating valve (13) prior to being supplied to the high-pressure fuel pump (7).

2. The fuel injection system according to claim 1, wherein the control means (27) comprises a temperature valve (27), and that the temperature valve (27) divides the supply line (5) into a first portion (5a) between the prefeed pump (1) and the temperature valve (27) and a second portion (5b) between the temperature valve (27) and the high-pressure fuel pump (7).

3. The fuel injection system according to claim 1, wherein the control means (27) is embodied as a multiposition valve, in particular as a 10½-way valve.

4. The fuel injection system according to claim 2, wherein the temperature valve (27) is embodied as a multiposition valve, in particular as a 10½-way valve.

5. The fuel injection system according to claim 1, wherein the control means (27) is embodied as a flow control valve.

6. The fuel injection system according to claim 2, wherein the temperature valve (27) is embodied as a flow control valve.

7. The fuel injection system according to claim 1, wherein the pressure regulating valve (13) has an inlet (21), a first outlet (15), and a second outlet (17); wherein the inlet (21) communicates hydraulically with the common rail (9); and wherein the pressure regulating valve (13) establishes a hydraulic communication between the inlet (21) on the one hand and the first outlet (15) and the second outlet (17) on the other as a function of the pressure in the common rail (9).

8. The fuel injection system according to claim 7, wherein in a first switching position of the control means (27), the first outlet (15) of the pressure regulating valve (13) communicates with the return line (33), the second outlet (17) of the pressure regulating valve (13) communicates with the leakage line (23), and the prefeed pump (1) pumps fuel via the supply line (5) into the high-pressure fuel pump (7); and in a second switching position of the control means (27), the first outlet (15) of the pressure regulating valve (13) communicates with a first portion (5a) of the supply line (5), the second outlet (17) of the pressure regulating valve (13) communicates with a second portion (5b) of the supply line (5), and the leakage line (23) communicates with the return line (33).

9. The fuel injection system according to claim 8, wherein a temperature sensor is provided in the second portion (5b) of the supply line (5), and wherein said control means (27) is triggered as a function of the temperature ascertained by the temperature sensor.

10. The fuel injection system according to claim 1, further comprising a fuel filter (35), in particular a fuel filter with a water separator, is provided in a second portion (5b) of the supply line (5) downstream of said control means (27).

11. The fuel injection system according to claim 1, wherein the prefeed pump (1) is driven electrically and is disposed in a tank (3).

* * * * *